F. A. FROMMANN.
WHEEL.
APPLICATION FILED SEPT. 30, 1911.
1,040,925.
Patented Oct. 8, 1912.
2 SHEETS—SHEET 1.
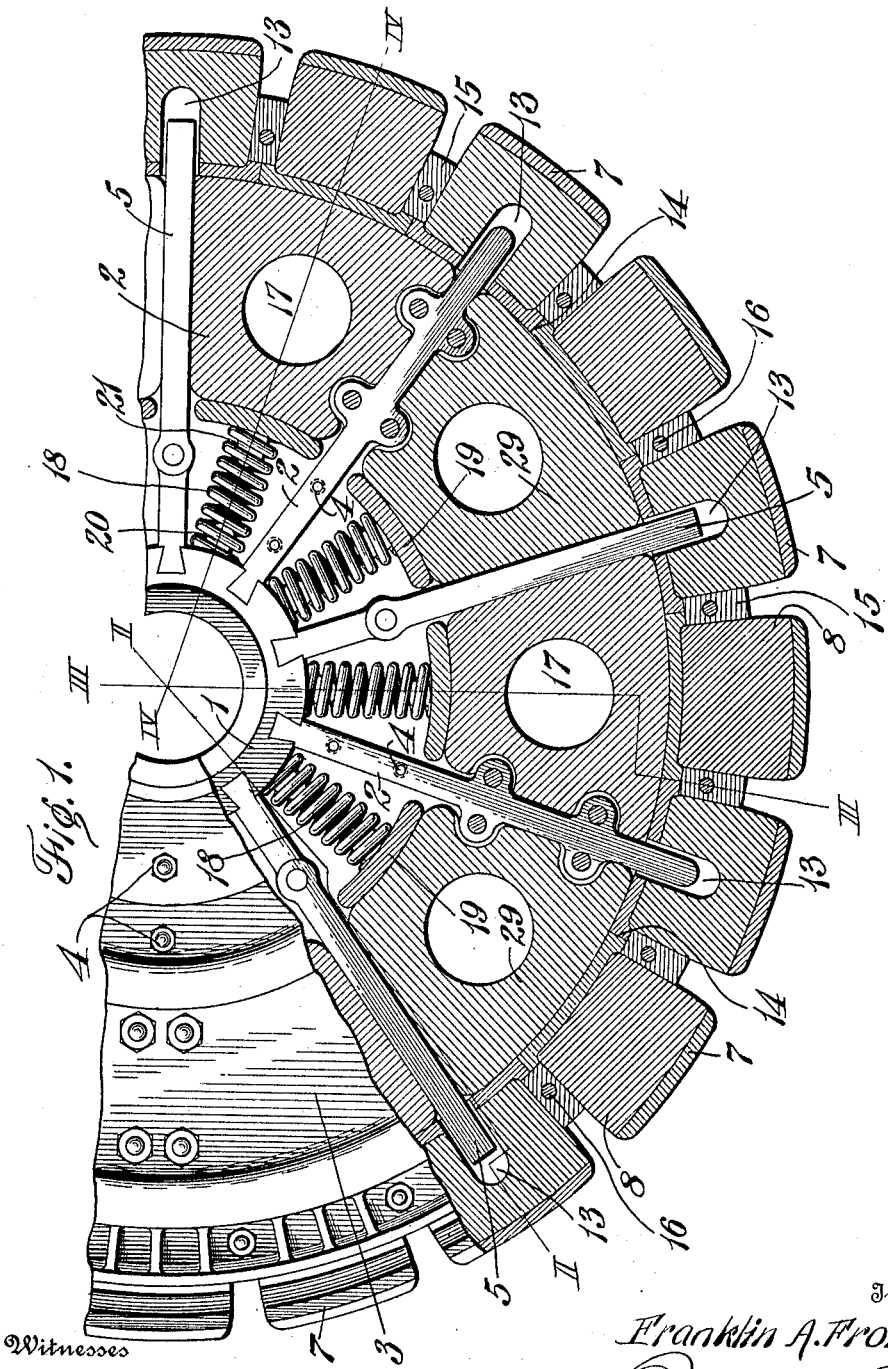
Witnesses
Chas. W. Stauffiger
G. M. Shannon
Inventor
Franklin A. Frommann,
By 
Attorneys

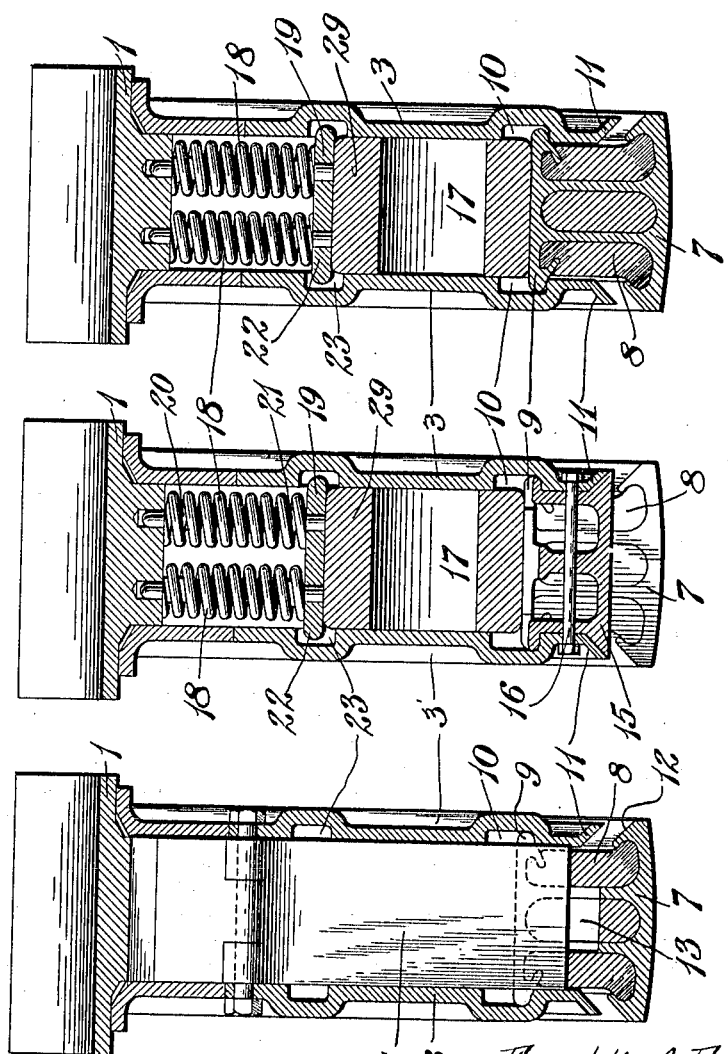

UNITED STATES PATENT OFFICE.

FRANKLIN A. FROMMANN, OF DETROIT, MICHIGAN.

WHEEL.

1,040,925.   Specification of Letters Patent.   Patented Oct. 8, 1912.

Application filed September 30, 1911. Serial No. 652,144.

*To all whom it may concern:*

Be it known that I, FRANKLIN A. FROMMANN, a citizen of the United States of America, residing at Detroit, in the county of Wayne and State of Michigan, have invented certain new and useful Improvements in Wheels, of which the following is a specification, reference being had therein to the accompanying drawings.

This invention relates to vehicle wheels and more especially to those adapted for use on motor trucks or other heavy vehicles, the wheel being arranged to afford yielding support to the load without the aid of pneumatic tubes or other like collapsible members and being disposed to operate without noise.

The invention consists in the matters hereinafter set forth and more particularly pointed out in the appended claims.

In the drawings, Figure 1 is a view, partially in side elevation and partially in section, of a portion of a wheel that embodies the invention; Fig. 2 is a view in section on line II—II of Fig. 1; Fig. 3 is a view in section on line III—III of Fig. 1; Fig. 4 is a view in section on line IV—IV of Fig. 1.

As herein indicated, a center hub 1 is provided with radial rigid guide members 2 between a pair of side plates 3, the latter preferably being held in position by suitably disposed bolts 4 or the like passing through the guide members. A series of flexible or articulated spacing arms 5 are regularly disposed between the fixed guide members.

A segmental tread is movably secured near the extremities of the guide members 2 and spacing members 5 between the side plates 3. In the preferred form the tread consists of a series of blocks 7 ribbed and flanged for strength and lightness with the spaces thereof preferably occupied with filler pieces 8 of rubber of like material. The inner face of each block has laterally extending marginal portions 9 which play in a pair of annular grooves 10 formed in the adjacent faces of the plates 3 so that the movement of the blocks is limited thereby. Preferably, also, the filler pieces 8 are disposed to bear against the adjacent portions of the plates 3 if the members 7 oscillate, thereby preventing any sound from contacting therewith. The peripheral marginal portions of the plates 3 are beveled to form seats for the correspondingly arranged faces 12 of the outer marginal portions of the tread blocks when the latter have reached their inner limit of motion. The blocks are so disposed that the alternate ones bridge the extremities of the guide plates 2 and spacing arms 5, such blocks having clearance grooves 13 for this purpose. The tread blocks have meeting end flange portions 14 over which guard members 15 are secured as by transverse pins 16 passing through the side plates 3. These guard members are seated on the marginal flange portions 11 of the side plates and co-act with the side plates to limit the movement of the members 7.

The segmental tread is normally projected from the navel of the wheel by blocks 29 of elastic material placed between the guide plates 2 and the spacing arms 5. These blocks may each have a center opening indicated at 17 to reduce the weight. In the preferred form of construction the blocks 29 which are loosely mounted between the guide plates and arms are projected by resilient members 18, such as coiled springs herein indicated or the like, in compression between the foot plates 19 and the hub 1. Suitable lugs 20 on the hub and bosses 21 on the foot plates form keepers to maintain these resilient members in place. The marginal portions 22 of the foot plates extend into annular grooves 23 in the side plates 3 which limit the movements thereof.

By this means a wheel is obtained having a flexible tread with a yielding cushion support that distributes any strain evenly throughout the wheel structure. The radial spacing arms permit the side thrust from one cushion to be communicated to the companion one when the former is compressed, thereby increasing the resiliency of the wheel. Movements between the members of the structure are noiseless from the disposition of the parts, whereby the faces in moving contact are of metal and an elastic material. Another result of the construction is the effective sealing of the interior of the wheel from the entrance of water and dirt, gained by the use of the guard members between the segmental tire blocks.

Obviously, changes in the details of construction may be made without departing from the spirit of the invention and I do not care to limit myself to any particular form or arrangement of parts.

What I claim is:—

1. In a vehicle wheel, a hub, a series of radially arranged plates on the hub, radially disposed spacing members articulated to the hub between the plates, segmental tread members disposed around the end portions of the plates and spacing members, means bearing against the spacing members and normally projecting the tread members and means limiting the movements of the tread members.

2. In a vehicle wheel, a hub, a series of radially disposed guide plates on the hub, a series of radial spacing plates articulated to the hub between the guide plates, segmental tread members around the end portions of the plates and spacing members, side plates adapted to limit the movement of the tread sections, and means between the side plates for bearing against the articulated spacing plates and yieldingly projecting the segmental tread members.

3. In a vehicle wheel, a hub, a pair of circular side plates secured thereon in spaced relation, a series of radially arranged guide plates on the hub between the side plates, radially disposed spacing members articulated to the hub between the guide plates and the side plates, segmental tread members disposed around the end portions of the guide plates between the marginal portions of the side plates against which they are adapted to seat themselves, guard members secured between the side plates and adapted to limit the outward movement of the tread members, and means between the guide plates and spacing members bearing against the articulated spacing members and yieldingly projecting the tread members.

4. In a vehicle wheel, a hub, a pair of circular side plates in spaced relation thereon, a series of radially arranged guide plates secured on the hub between the side plates, radially disposed spacing members articulated to the hub between the side plates in alternation with the guide plates, segmental tread blocks around the end portions of the guide plates and spacing members between the side plates adapted to bear on the margins of the latter when at their inner limit of motion, a series of guard blocks alternating with the segmental members secured between the side plates over the meeting end portions of the tread blocks, and elastic means between the hub and tread members for normally projecting the latter, the articulated spacing members being adapted to transmit movement of the elastic projecting means from one part thereof to another when the tread members are being compressed.

5. In a vehicle wheel, a hub, a pair of circular side plates secured thereon in spaced relation, a series of radially arranged guide plates on the hub between the side plates, radial spacing members articulated to the hub between the side plates in alternation with the guide plates, cushioning means between the side plates filling the spaces between the guide plates and radial spacing members, the latter moving with the cushioning means, segmental tread members around the end portions of the guide plates and spacing members, whose inner end portions loosely interlock with annular grooves in the side plate and whose outer end portions are adapted to rest against the marginal portions of the side plates when at the inner limit of motion, and guard members secured between the side plates over the abutting end portions of the tread members for limiting the outward movement thereof.

6. In a vehicle wheel, a hub, a pair of side plates secured in spaced relation on the hub and provided on their inner faces with registering annular grooves concentric with the hub, a series of radially arranged guide plates on the hub between the side plates, radial spacing members articulated to the hub between the side plates in alternation with the guide plates, segmental tread sections around the end portions of the guide plates and spacing members, having laterally flanged ends entering the grooves of the side plates, and outer laterally flanged end portions adapted to bear against the margins of the side plates, guard members secured between the side plates in alternation with the segmental tread members over the inner abutting end portions of the latter, and means confined between the side plates and the radial members of the wheels for yieldingly projecting the tread members, the articulated spacing members forming movable abutments between sections of the projecting means and transferring pressures from one portion to the other portion thereof.

7. In a vehicle wheel, a hub, a pair of side plates secured in spaced relation thereon, radially disposed guide plates on the hub between the side plates, radial spacing members articulated to the hub between the side plates in alternation with the guide plates, a series of segmental tread blocks encircling the end portions of the guide plates and spacing members with their inner end flanges in contact, guard blocks secured between the side plates and the bodies of the tread blocks over the abutting end portions of the latter for limiting the outer movement thereof, and resilient cushioning means in compression between the tread blocks and the inner portion of the wheel for yieldingly projecting the tread blocks.

8. In a vehicle wheel, a hub, a pair of side plates secured in spaced relation on the hub and provided with annular grooves on their inner faces concentric with the hub and with outwardly flanged beveled margins, segmental tread blocks having outer lateral margins adapted to seat on the adjacent margins of the side plates, inner lateral margins entering some of the annular grooves of the side plates and end flanges on their inner ends in abutment, guard blocks secured to the side plates between the bodies of the tread blocks over the abutting end flanges of the latter, foot plates entering the other annular grooves of the side plates, an elastic member between each foot plate and adjacent tread members, and means between each foot plate and the hub for yieldingly projecting the former.

9. In a vehicle wheel, a hub, a pair of side plates secured thereon in spaced relation with pairs of annular grooves on the inner faces in registration concentric with the hub, radial guide plates on the hub between the side plates, radial spacing members articulated to the hub between the side plates in alternation with the guide plates, foot plates between the radial guide plates and spacing members, entering the inner pair of side plate grooves, spring members yieldingly projecting the foot plates, elastic members contiguous to the articulated spacing members which form movable abutments therefor, each radially projected normally by a foot plate, segmental tread blocks disposed around the end portions of the guide plates and spacing members, against the elastic members with their inner end portions in abutment and in interlocking relation with the outer pair of grooves of the side plate, outer flanges on the tread blocks adapted to seat against the peripheral flanges of the side plates, and guard blocks secured to the side plates between the bodies of the tread members over the abutting ends of the latter.

In testimony whereof I affix my signature in presence of two witnesses.

FRANKLIN A. FROMMANN.

Witnesses:
OTTO F. BARTHEL,
A. M. SHANNON.

---

Copies of this patent may be obtained for five cents each, by addressing the "Commissioner of Patents, Washington, D. C."